United States Patent
Awasare et al.

(10) Patent No.: US 12,326,156 B2
(45) Date of Patent: Jun. 10, 2025

(54) FLUID PUMP

(71) Applicant: MAHLE INTERNATIONAL GMBH, Stuttgart (DE)

(72) Inventors: Alok Awasare, Pune (IN); Martin Gross, Kämpfelbach (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 98 days.

(21) Appl. No.: 18/210,247

(22) Filed: Jun. 15, 2023

(65) Prior Publication Data
US 2023/0407882 A1 Dec. 21, 2023

(30) Foreign Application Priority Data
Jun. 20, 2022 (DE) .......................... 102022206141.1

(51) Int. Cl.
| | | |
|---|---|---|
| F04D 13/06 | (2006.01) | |
| F04D 1/00 | (2006.01) | |
| F04D 29/44 | (2006.01) | |
| H01M 8/04029 | (2016.01) | |

(52) U.S. Cl.
CPC ............ *F04D 29/445* (2013.01); *F04D 1/00* (2013.01); *F04D 13/06* (2013.01); *H01M 8/04029* (2013.01)

(58) Field of Classification Search
CPC .. F04D 1/00; F04D 13/06; F04D 29/58–5893; H02K 5/203; H02K 9/00–28
See application file for complete search history.

(56) References Cited

U.S. PATENT DOCUMENTS

| | | | | |
|---|---|---|---|---|
| 5,616,973 A | * | 4/1997 | Khazanov | ........... F04D 29/5806 310/58 |
| 2017/0218966 A1 | * | 8/2017 | Haylock | ............... F04D 27/004 |
| 2021/0180609 A1 | | 6/2021 | Geue et al. | |

FOREIGN PATENT DOCUMENTS

| | | | |
|---|---|---|---|
| DE | 102007036238 | 2/2009 | |
| DE | 102018125031 | 4/2020 | |
| DE | 102018126775 | 4/2020 | |
| DE | 102018126775 A1 * | 4/2020 | ......... F04D 13/0686 |
| WO | 2021/213783 | 10/2021 | |

* cited by examiner

*Primary Examiner* — Thomas Fink
(74) *Attorney, Agent, or Firm* — Barnes & Thornburg LLP

(57) ABSTRACT

The invention relates to a fluid pump (1), which comprises an impeller unit (2) with an impeller (4) and an electric motor (6) with a motor housing (10). The impeller unit (2) comprises an inlet side (2a) with a fluid inlet (5a) and an outlet side (2b) with a fluid outlet (5b), wherein a guide channel (26) fluidically connects the inlet side (2a) and the outlet side (2b) via the impeller (4).
It is substantial for the invention that the guide channel (26) is additionally realised in regions by a cooling fluid jacket (27) formed in the motor housing (10).

9 Claims, 6 Drawing Sheets

FLUID PUMP

CROSS-REFERENCE TO RELATED APPLICATIONS

Figure 1:
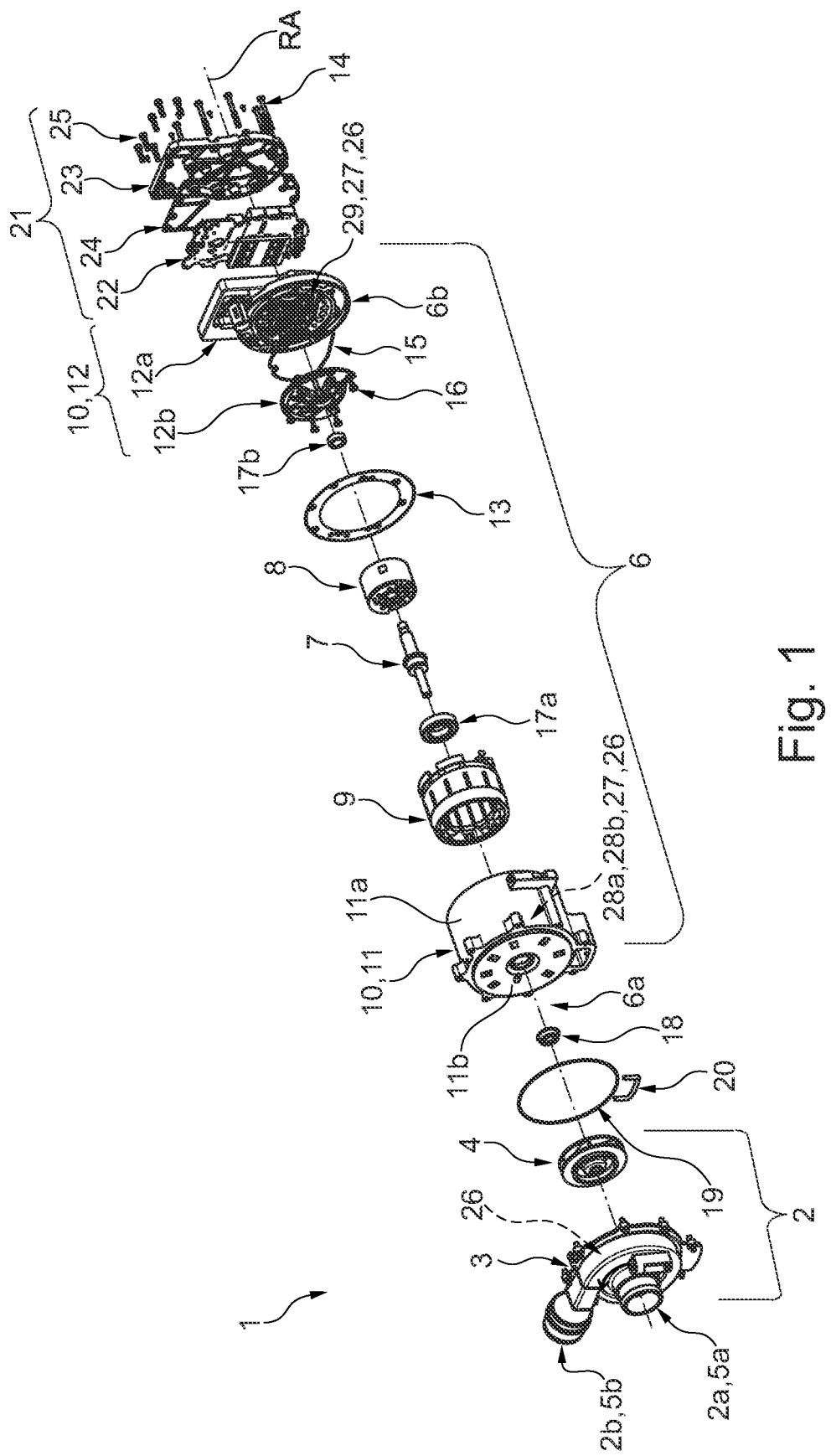

This application claims priority from German Patent Application No. DE 10 2022 206 141.1, filed on Jun. 20, 2022, the entirety of which is hereby fully incorporated by reference herein.

The invention relates to a fluid pump for a fuel cell system having at least one fuel cell stack of multiple fuel cells according to the preamble of claim 1.

Fluid pumps are already known from the prior art and usually include an impeller for delivering a fluid and an electric motor for driving the impeller. Among other things, fluid pumps can be employed for cooling a fuel cell system. Then, the fuel cell system usually comprises multiple fuel cell stacks which are cooled by the fluid delivered by means of the fluid pump. During the operation of the fluid pump, heat is also generated in the motor and the motor has to be cooled. Cooling the motor can take place, for example, by the stator and the rotor being directly flowed about by the fluid delivered by means of the fluid pump. However, when cooling the fuel cell stacks of the fuel cell system there are separate requirements on the fluid. In particular, the fluid should be dielectric and also remain dielectric. Because of a high ion emission, the stator and the rotor cannot be directly flowed about by the fluid in the fluid pump provided for the fuel cell system. Accordingly, a separate cooling of the motor is necessary which can be complex and cost-intensive.

The object of the invention therefore is to state for a fluid pump of the generic type an improved or at least alternative embodiment, with which the described disadvantages are overcome.

According to the invention, this object is solved through the subject of the independent claim 1. Advantageous embodiments are subject of the dependent claims.

A fluid pump is provided for a fuel cell system having at least one fuel cell stack of multiple fuel cells. The fluid pump comprises an impeller unit with an impeller that is rotatable about an axis of rotation and an electric motor with a motor housing. The impeller unit is arranged at a, with respect to the axis of rotation, axial longitudinal end of the motor. The impeller unit is designed for delivering a cooling fluid and the motor for driving the impeller of the impeller unit. The impeller unit comprises an inlet side or a low-pressure side with a fluid inlet and an outlet side or a high-pressure side with a fluid outlet. The impeller separates the inlet side and the outlet side from one another. In addition, the fluid pump comprises a guide channel for the cooling fluid, wherein the guide channel fluidically connects the inlet side and the outlet side via the impeller. According to the invention, the guide channel is additionally realised in regions by a cooling fluid jacket formed in the motor housing.

The electric motor can be constructed in a manner known to the person skilled in the art. Accordingly, the electric motor can comprise a rotating shaft defining the axis of rotation of the impeller, a rotor that is non-rotatably connected to the shaft and a stator receiving the rotor. Then, the shaft can be appropriately drive-connected or non-rotatably connected to the impeller.

In the fluid pump according to the invention, the motor is then cooled with the cooling fluid delivered by means of the fluid pump. Because of this, a complex and cost-intensive additional cooling of the motor can be avoided. The cooling fluid jacket is formed in the motor housing and delimited in a fluid-tight manner towards the outside by the motor housing, so that the cooling fluid does not come into direct contact with further components of the motor. Because of this, an ion emission into the cooling fluid can be excluded on the one hand and further components of the motor be indirectly cooled by the cooling fluid on the other hand. In particular, a higher motor efficiency and at the same time a better cooling of electrical components of the motor—as for example the stator—can be achieved then with a wet runner. In particular, the cooling fluid can be dielectric or electrically non-conductive. The cooling fluid is primarily a liquid. The cooling fluid can be for example a water-containing mixture such as water-glycol mixture.

The cooling fluid jacket can be formed by a double-walled region at least in regions. The double-walled region can, at least in regions, be formed in the motor housing and/or in a pot-shaped housing body of the motor housing and/or in a housing wall circumferential to the axis of rotation of a pot-shaped housing body of the motor housing and/or in a bottom of the motor housing closing a pot-shaped housing body transversely to the axis of rotation. The double-walled region can be formed circumferentially about the axis of rotation and in particular be completely circumferential to the axis of rotation. Because of this, the motor housing, circumferential to the axis of rotation, can be cooled evenly. The double-walled region can be formed by an outer wall and an inner wall and be delimited towards the outside. The inner wall can be arranged spaced apart from the outer wall. The cooling fluid jacket is then arranged between the outer wall and the inner wall. The double-walled region can comprise at least one separating region, wherein by means of the at least one separating region, individual channels that can be flowed through by the cooling fluid are formed in the cooling fluid jacket and/or fluidically separated from one another. In particular, the channels that can be flowed through by the cooling fluid can include at least one forward channel and/or at least one return channel and/or at least one connecting channel. Because of the double-walled construction of the cooling fluid jacket, heat-generating components in the fluid pump and in particular the electric motor can be effectively cooled.

The cooling fluid jacket can comprise at least one forward channel, at least one connecting channel and at least one return channel. The at least one forward channel can lead from the outlet side of the impeller unit to the at least one connecting channel. The at least on connecting channel can lead from the at least one forward channel to the at least one return channel. The at least one return channel can lead from the at least one connecting channel to the inlet side of the impeller unit. The at least one forward channel thus merges into the at least one connecting channel and the at least one connecting channel into the at least one return channel. In other words, the at least one connecting channel and the at least one return channel are fluidically connected to one another via the at least one connecting channel. It is to be understood that the fluid pump can comprise multiple forward channels and/or multiple connecting channels and/or multiple return channels. The number of the forward channels and/or the number of the connecting channels and/or the number of the return channels can be identical or different. The multiple forward channels and/or the multiple connecting channels and/or the multiple return channels can each be fluidically separated from one another or fluidically connected to one another.

The cooling fluid jacket fluidically connects the outlet side or the high-pressure side of the impeller unit and the inlet side or the low-pressure side of the impeller unit with one another. Since on the outlet side or the high-pressure side of the impeller unit there is a higher pressure on the inlet side or the low-pressure side of the impeller unit during the operation of the fluid pump, the cooling fluid in the cooling fluid jacket can be delivered. In the process, the cooling fluid delivered by means of the impeller from the inlet side to the outlet side partly flows into the fluid outlet and partly into the at least one forward channel. By way of the at least one forward channel, the cooling fluid flows further into the at least one connecting channel and further into the at least one return channel. From the at least one return channel, the cooling fluid flows to the inlet side of the impeller unit and is again delivered to the outlet side by means of the impeller. Because of this, the cooling fluid jacket can be flowed through by the cooling fluid delivered by means of the impeller and the electric motor or further heat-generating components of the motor be indirectly cooled.

The cooling fluid jacket can comprise multiple forward channels, wherein the respective forward channels are fluidically connected to the outlet side of the impeller unit via an inlet opening each. The multiple forward channels can extend in the motor housing axially or parallel to the axis of rotation of the impeller. In addition, the multiple forward channels can be formed distributed about the axis of rotation in the motor housing.

Accordingly, the inlet openings of the respective multiple forward channels can be formed distributed about the axis of rotation in the motor housing. The outlet side of the impeller unit is formed on the circumference of the impeller and the respective inlet openings of the respective multiple forward channels can thus be distributed about the axis of rotation on the circumference of the impeller. The multiple forward channels can be fluidically connected to one another. In particular, the multiple forward channels can be fluidically connected to one another at bridging points in a circumferential direction that is circumferential to the axis of rotation. The multiple forward channels can form a common overall channel that is circumferential to the axis of rotation, wherein in the overall channel the flow direction is defined by the orientation of the individual forward channels.

Advantageously, a cross-section of the at least one forward channel can increase from the inlet side of the impeller unit to a longitudinal end of the motor located opposite the impeller unit. In other words, a cross-section of the at least one forward channel can increase in size from the inlet side of the impeller unit to a longitudinal end of the motor located opposite the impeller unit in the axial direction. In particular, the cross-section of the at least one forward channel can increase uniformly from the inlet side of the impeller unit to a longitudinal end of the motor located opposite the impeller unit. In particular, the at least forward channel can be formed conically. The motor housing with the forward channel formed in such a manner can be manufactured in a die-casting method as a one-piece part, wherein by the increasing cross-section of the forward channel the demouldability of the motor housing is ensured and the manufacture of the motor housing simplified.

It is conceivable, in addition, that in the at least one forward channel two demoulding bevels located opposite one another are formed and a cross-section of the at least one forward channel does not increase from the inlet side of the impeller unit to a longitudinal end of the motor located opposite the impeller unit. With the forward channel formed in such a manner, the motor housing can be produced as a two-piece part, wherein through the demoulding bevel the demouldability of the individual parts of the motor housing can be ensured and the manufacture of the motor housing simplified.

Alternatively it is conceivable that a cross-section of the at least one forward channel does not increase from the inlet side of the impeller unit to a longitudinal end of the motor located opposite the impeller unit and no demoulding bevels are formed in the at least one forward channel. The motor housing with the forward channel formed in such a manner can be manufactured for example with a lost mould casting method.

The motor housing can comprise a pot-shaped housing body and the housing body can be open at a longitudinal end of the motor located opposite the impeller unit. In addition, the motor housing can comprise a bottom oriented transversely to the axis of rotation and the bottom can close the pot-shaped housing body at a longitudinal end of the motor located opposite the impeller unit. Because of this, an interior can be formed in the motor housing which is delimited towards the outside by the pot-shaped housing body and the bottom. In the interior, further components of the electric motor can be received. The at least one forward channel and the at least one return channel can then be formed in the housing body at least in regions and be delimited towards the outside by the housing body. The at least one connecting channel can then be formed in the bottom of the motor housing.

The bottom of the motor housing can be formed by a bottom plate and a cover and the cover, facing the impeller unit, can sealingly lie against the bottom plate. The at least one connecting channel can be formed between the bottom plate and the cover and be delimited towards the outside by the bottom plate and the cover. The at least one connecting channel can be advantageously formed meander-like and/or labyrinth-like. Alternatively, a turbulence-generating structure can be formed in the at least one connecting channel. It is also conceivable that in the at least one connecting channel at least one separate turbulence insert is arranged.

The cooling fluid jacket can be exclusively connected fluidically with the inlet side of the impeller unit and with the outlet side of the impeller unit. The pot-shaped housing body can comprise a housing wall that is circumferential to the axis of rotation and a partition wall oriented transversely to the axis of rotation. The partition wall can be formed integrally or in one piece or out of a piece of material with the housing wall. The partition wall can be arranged at a longitudinal end of the motor facing the impeller unit and fluidically separate an interior formed in the pot-shaped housing body or in the motor housing from the impeller unit or from the impeller or from the inlet side and the outlet side of the impeller unit. The at least one forward channel can then be fluidically connected through the partition wall to the outlet side of the impeller unit and the at least one return channel can then be fluidically connected through the partition wall to the inlet side of the impeller unit.

Advantageously, the fluid pump can comprise an inverter for the energy supply of the motor. The inverter can be arranged at the longitudinal end of the motor located opposite the impeller unit on the motor housing in a heat-transferring manner and adjacently to the cooling fluid jacket. In addition, the inverter can be indirectly coolable via the cooling fluid jacket by the cooling fluid delivered by means of the impeller unit. The inverter can convert a DC voltage, for example, of a battery into an AC voltage for driving the motor. The inverter can comprise in particular current-conducting components which are appropriately separated fluidically from the guide channel or the cooling fluid jacket. Accordingly, the inverter can be appropriately arranged on the motor housing outside. The current-conducting components can include in particular a control board with power semi-conductors—for example IGBTs—wherein the control board is then indirectly cooled by the cooling fluid delivered by means of the impeller unit.

As already described above, the motor can comprise a shaft, wherein the shaft is rotatable about the axis of rotation and is drive-connected or non-rotatably connected to the impeller of the impeller unit. In addition, the fluid pump can comprise a bearing for mounting the shaft at a longitudinal end of the motor located opposite the impeller unit and the bearing can be arranged on the motor housing in a heat-transferring manner and adjacent to the cooling fluid jacket. The bearing can thus be indirectly coolable via the cooling fluid jacket by the cooling fluid delivered by means of the impeller unit. In particular, the bearing can be arranged on the cover of the bottom facing the impeller unit. Because of this, the bearing, on the one hand, can be separated by the cover from the at least one connecting channel in the bottom of the motor housing and on the other hand particularly effectively cooled.

Further important features and advantages of the invention are obtained from the subclaims, from the drawings and from the associated figure description by way of the drawings.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein same reference numbers relate to same or similar or functionally same components.

Figure 2:
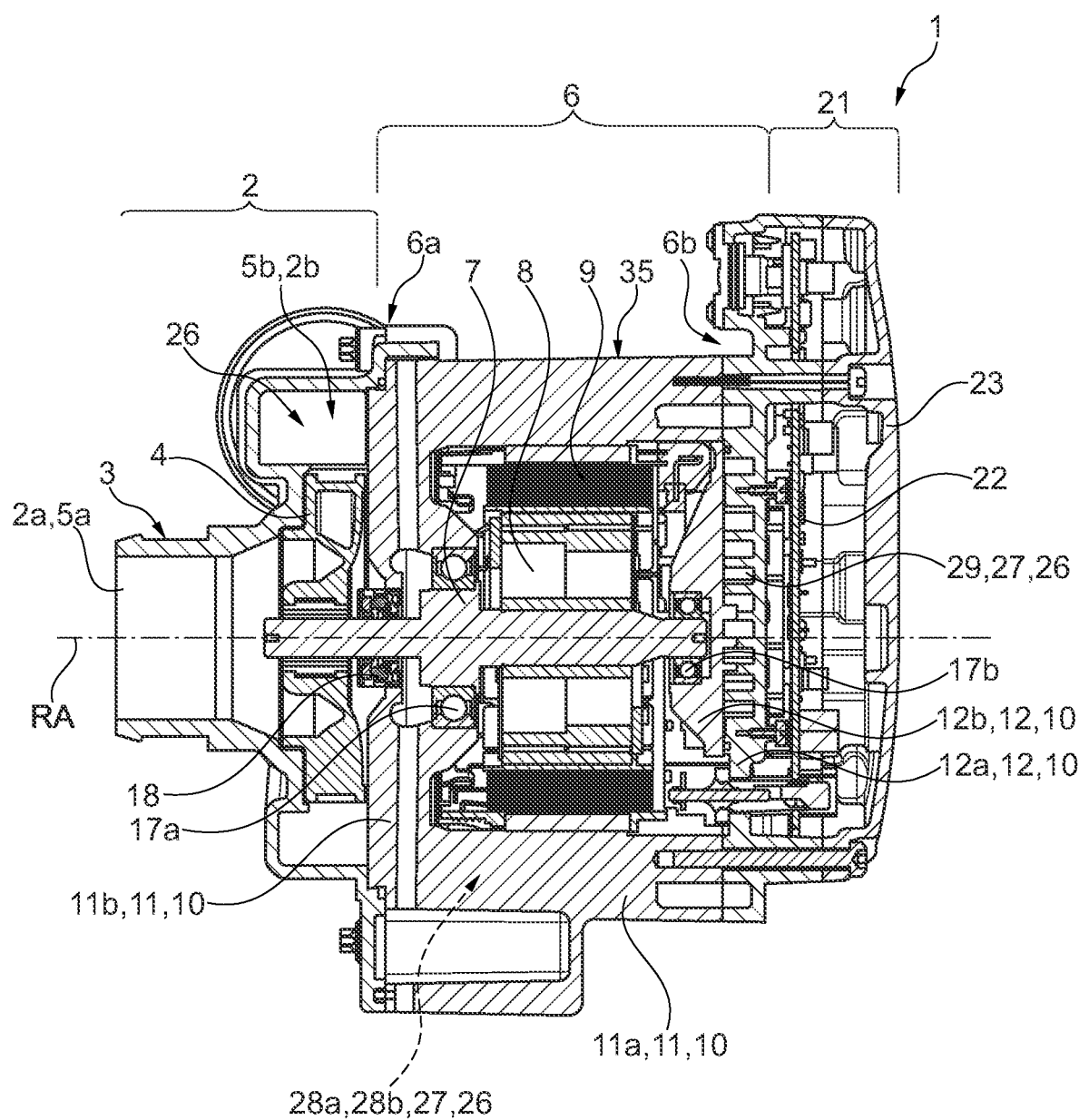
Figure 3:
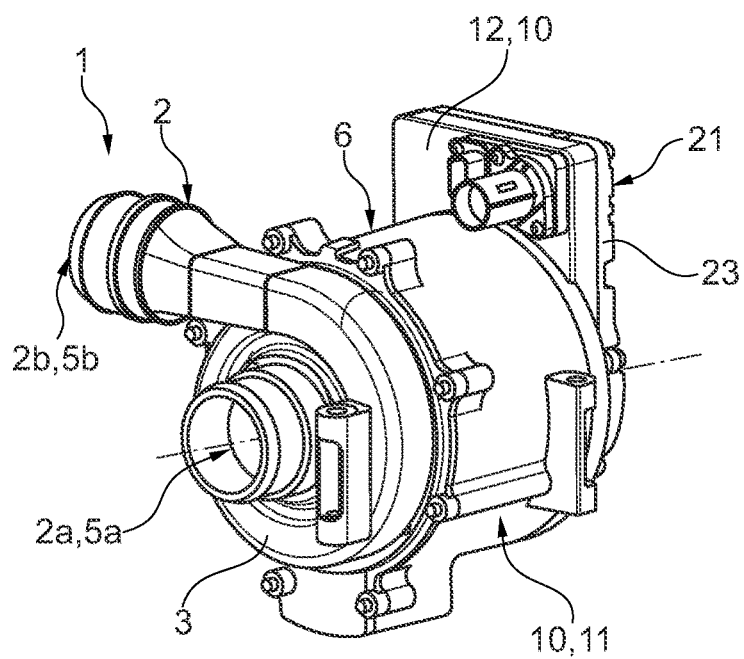
Figure 4:
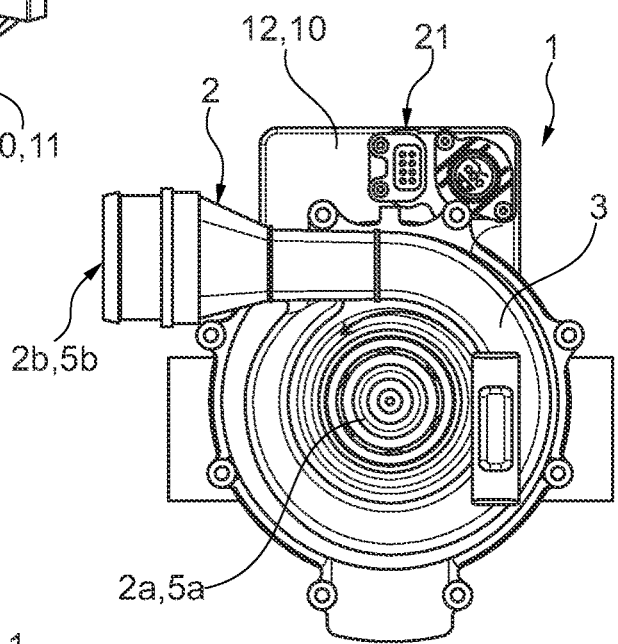
Figure 5:
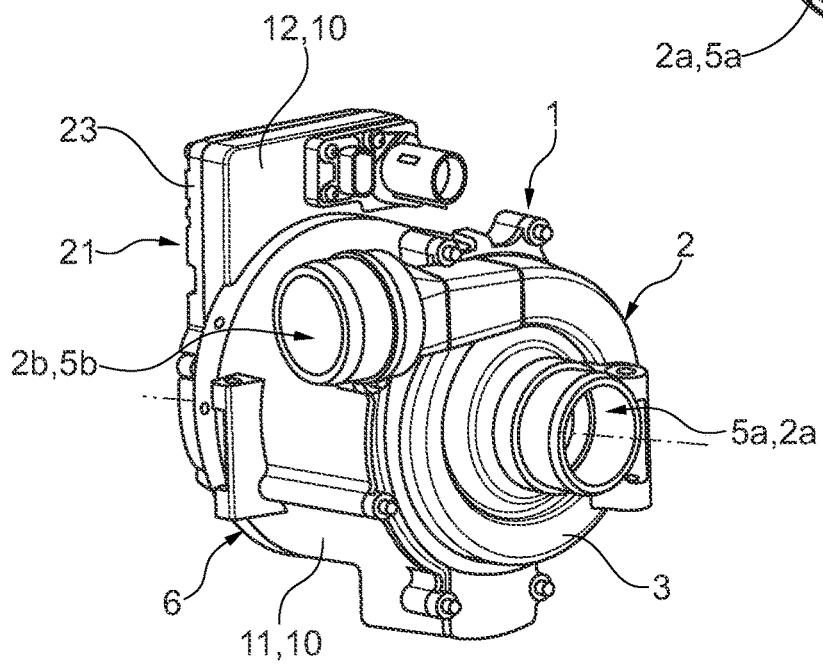
Figure 6:
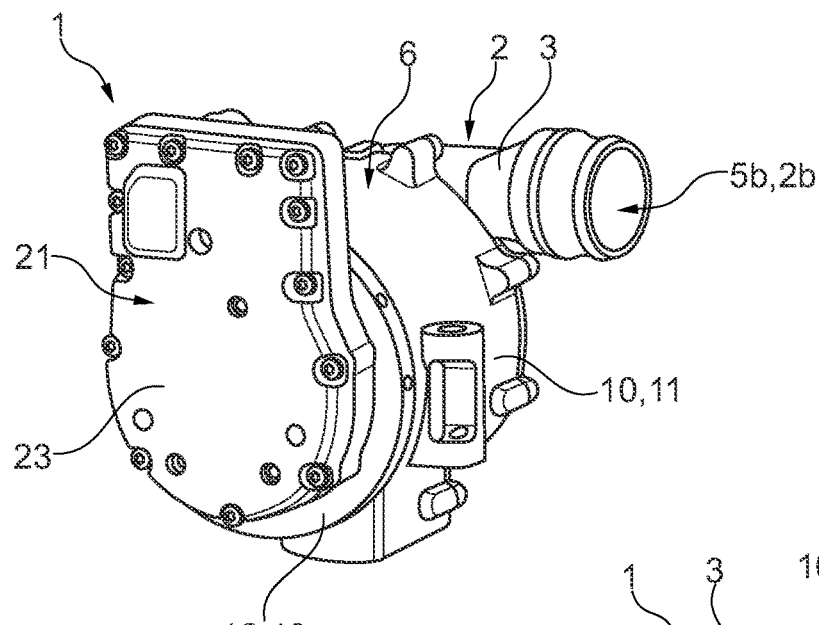
Figure 7:
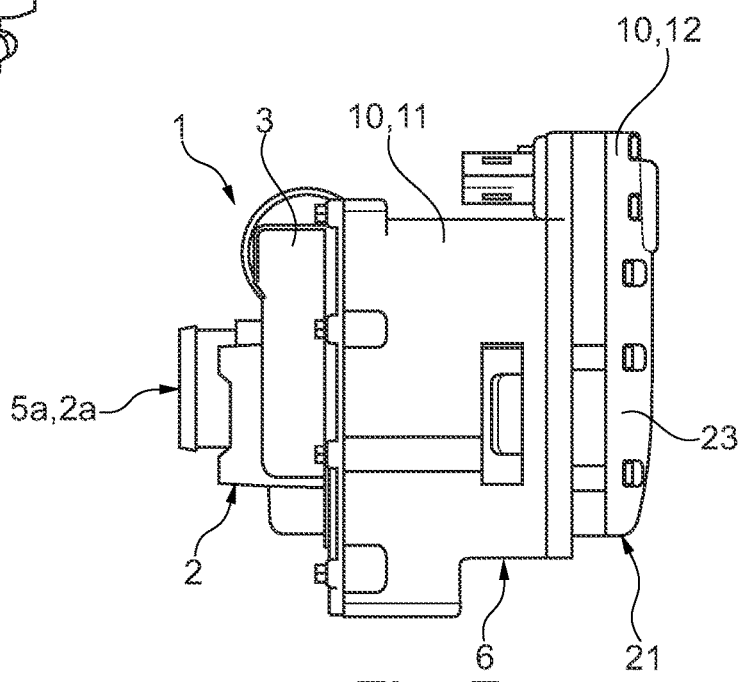
Figure 8:
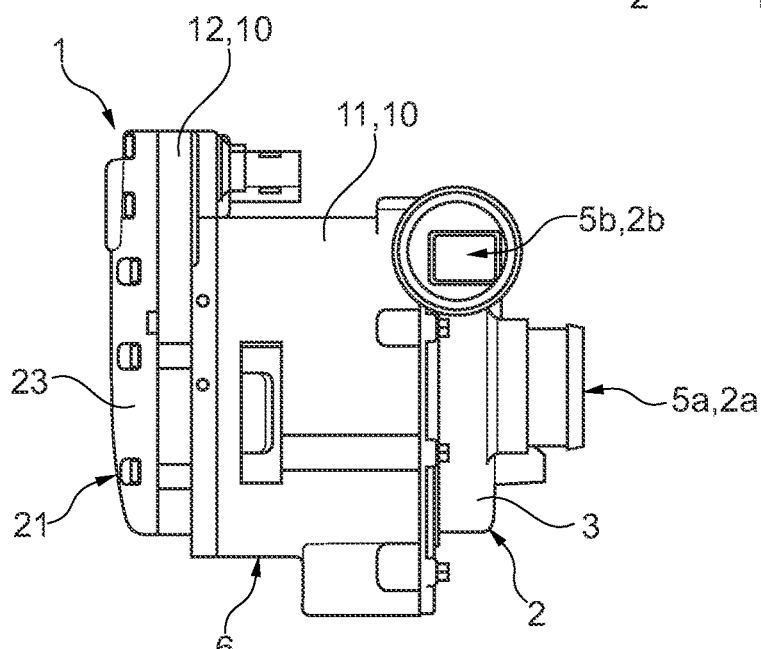
Figure 9:
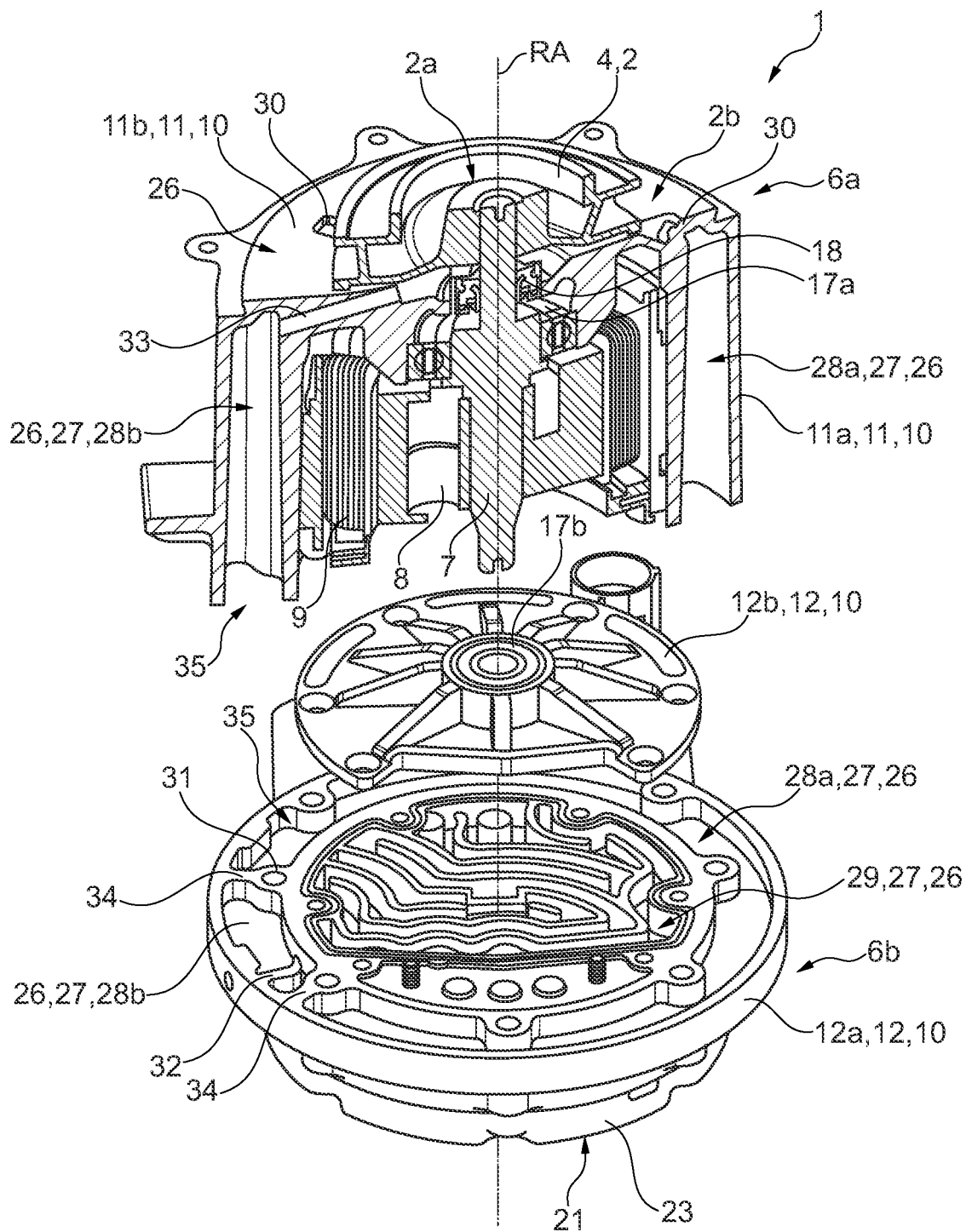
Figure 10:
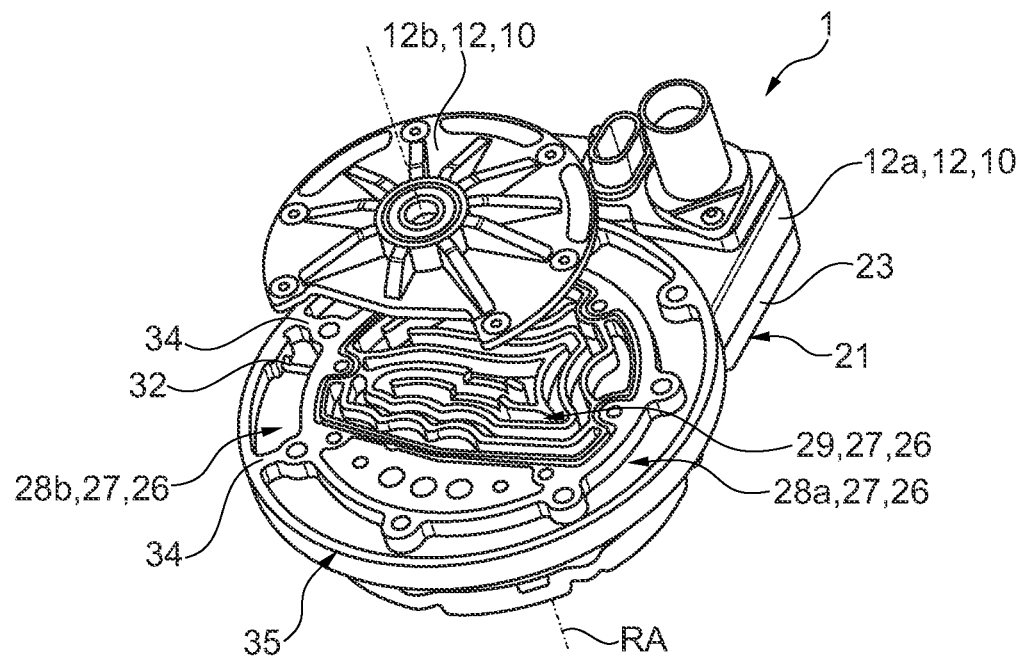
Figure 11:
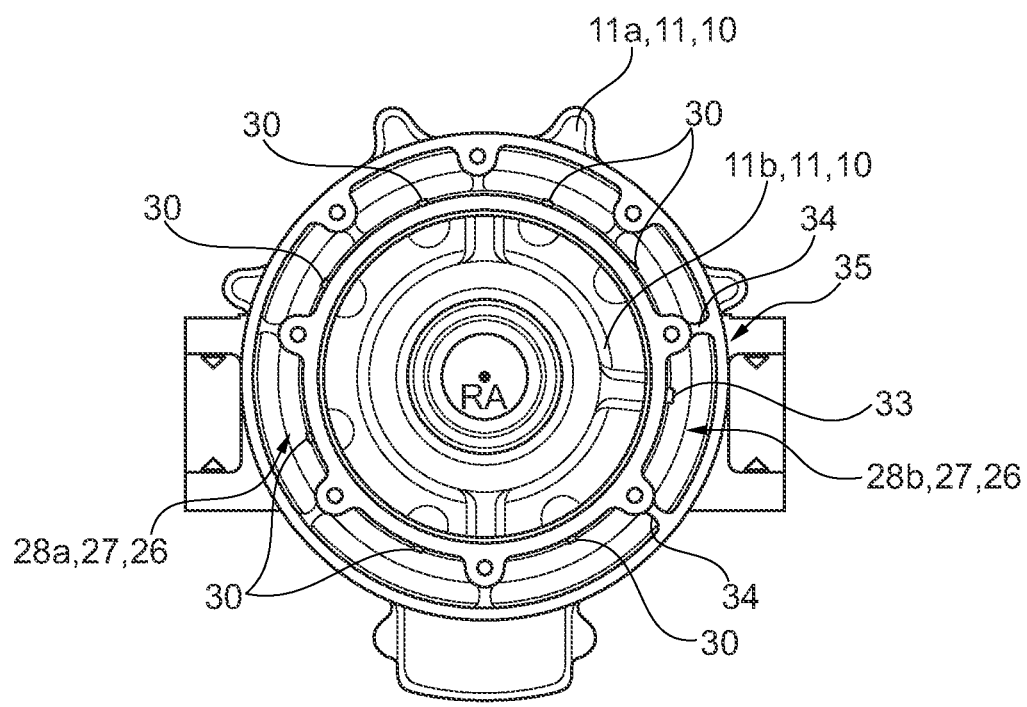

It shows, in each case schematically:

FIG. 1 an exploded view of a fluid pump according to the invention;

FIG. 2 a sectional view of the fluid pump according to the invention;

FIG. 3-8 differing views of the fluid pump according to the invention;

FIG. 9 an exploded view of the fluid pump according to the invention with a partial section;

FIG. 10 an exploded view of a housing body of the fluid pump according to the invention;

FIG. 11 a view of a housing body of the fluid pump according to the invention.

FIG. 1 shows an exploded view of a fluid pump 1 according to the invention. The fluid pump 1 is provided or designed for a fuel cell system having at least one fuel cell stack of multiple fuel cells. The fuel cell system can be provided or designed in particular for a commercial vehicle. The fluid pump 1 comprises an impeller unit 2 with an impeller housing 3 and an impeller 4. The impeller unit 2 comprises an inlet side 2a—or a low-pressure side—with a fluid inlet 5a and an outlet side 2b—or a high-pressure side—with a fluid outlet 5b. The inlet side 2a and the outlet side 2b are separated from one another by the impeller 4 or fluidically connected to one another. The fluid inlet 5a and the fluid outlet 5b are formed in the impeller housing 3.

In addition, the fluid pump 1 comprises an electric motor 6. The electric motor 6 can be in particular a permanent magnet synchronous motor. The motor 6 includes a shaft 7 that is rotatable about an axis of rotation RA, a rotor 8 that is firmly connected to the shaft 7 and a stator 9 receiving the rotor 8. The shaft 7 is drive-connected to the impeller 4 so that the impeller 4 is rotatable about the axis of rotation RA. The motor 6 comprises two longitudinal ends 6a and 6b, which with respect to the axis of rotation RA are located opposite one another. The impeller unit 2 is arranged at the longitudinal end 6a of the motor 6.

Further, the motor 6 comprises a motor housing 10 with a pot-shaped housing body 11 and a bottom 12 oriented transversely to the axis of rotation RA. In addition, the motor housing 10 comprises a housing seal 13 which is arranged or sealingly clamped between the housing body 11 and the bottom 12 and seals the relevant joint towards the outside. The housing body 11 and the bottom 12 are screwed to one another by means of multiple housing screws 14. The housing body 11 comprises a housing wall 11a that is circumferential to the axis of rotation RA and a partition wall 11b oriented transversely to the axis of rotation RA. The partition wall 11b fluidically separates the impeller 4 from the rotor 8 and the stator 9. The bottom 12 comprises a bottom plate 12a and a cover 12b, wherein the cover 12b closes the bottom plate 12a on the stator side or rotor side or impeller side. Between the bottom plate 12a and the cover 12b a cover seal 15 is arranged or sealingly clamped, which seals the relevant joint towards the outside. The bottom plate 12a and the cover 12b are screwed to one another by means of multiple cover screws 16.

The stator 9 is non-rotatably received in the motor housing 10 and the shaft 7 with the rotor 8 is rotatingly received in the motor housing 10 or in the stator 9. To this end, the fluid pump 1 comprises two bearings 17a and 17b which rotatably mount the shaft 7 at the respective longitudinal ends 6a and 6b of the motor 6. In addition, an impeller seal 18 is arranged on the shaft 7 at the longitudinal end 6a.

Further, the fluid pump 1 comprises a sliding ring seal 19. The sliding ring seal 19 is arranged or sealingly clamped between the motor housing 10 and the impeller housing 3 and seals the relevant joint towards the outside. The sliding ring seal 19 is preferentially formed from SiC. Furthermore, the fluid pump 1 comprises a U-seal 20 which is arranged or sealingly clamped in the same way between the motor housing 10 and the impeller housing 3.

Further, the fluid pump 1 comprises an inverter 21 for the energy supply of the motor 6. The inverter 21 can be designed for example for converting a DC voltage between 400 V and 860 V. The inverter 21 is arranged on the bottom 12 at the longitudinal end 6b of the motor 6. The inverter 21 includes a control board 22 and an inverter cover 23, wherein the control board 22 is arranged between the bottom 12 or the bottom plate 12a of the motor housing 10 and the inverter cover 23 facing away from the impeller unit 2 or on the outside. In addition, the inverter 21 includes an inverter seal 24 which is arranged or sealingly clamped between the bottom 12 or the bottom plate 12a and the inverter cover 23 and seals the relevant joint towards the outside. The bottom 12 or the bottom plate 12a and the inverter cover 23 are screwed to one another by means of multiple inverter screws 25.

The fluid pump 1 is designed for delivering a cooling fluid—preferentially a liquid. To this end, the fluid pump 1 comprises a guide channel 26 which leads from the fluid inlet on the inlet side 2a to the fluid outlet 5b on the outlet side 2b via the impeller 4. In addition, the guide channel 26 is realised in regions by a cooling fluid jacket 27 formed in the motor housing 10. The cooling fluid jacket 27 includes multiple—here seven—forward channels 28a and a return channel 28b in the housing body 11 and a meander-like or labyrinth-like connecting channel 29 between the bottom plate 12a and the cover 12b. The cooling fluid jacket 27 is delimited towards the outside by the motor housing and the rotor 8 and the stator 9 are not directly impinged by the cooling fluid or not directly flowed about. The cooling fluid itself can be dielectric. The construction of the cooling fluid jacket 27 is described in more detail in the following by way of FIG. 9 to FIG. 11.

The fuel cell system can be provided in particular for a commercial vehicle. In this case, the fluid pump 1 can be designed in such a manner that the only fluid pump 1 is sufficient for cooling the fuel cell system even with multiple fuel cell stacks. Accordingly, the fluid pump 1 can have a maximum electrical power between 4,000 W and 6,000 W, preferentially 4,500 W, and/or a maximum rate of delivery between 400 l/min and 700 l/min and/or a maximum pressure between 3 bar and 4 bar, preferentially 3.5 bar, and/or a maximum rotational speed between 5,000/min and 6,000/min, preferentially and/or a maximum torque between 6.0 Nm and 8.0 Nm. The impeller 4 can have a maximum efficiency between 60% and 70%, preferentially 65%. Here, the maximum values are based on a full load operation of the fluid pump 1.

FIG. 2 shows a sectional view of the fluid pump 1 according to the invention. In FIG. 2, the connecting channel 29 of the cooling fluid jacket 27 in particular is noticeable between the bottom plate 12a and the cover 12b of the motor housing 10. The forward channels 28a and the return channel 28b are arranged adjacent to the stator 9 of the motor 6 and the connecting channel 29 adjacent to the control board 22 of the inverter 21 and to the bearing 17b. Because of this, the stator 9, the control board 22 and the bearing 17b can be indirectly cooled by the cooling fluid delivered by means of the impeller unit 2.

FIGS. 3 to 8 show differing views of the fluid pump 1. In FIG. 3 to FIG. 8, the fluid pump is shown in the mounted state.

FIG. 9 shows an exploded view of the fluid pump 1 according to the invention in a partial section. Here, the impeller housing 3 is not shown for the sake of clarity. As already described above, the guide channel 26 connects the inlet side 2a or the low-pressure side of the impeller unit 2 with the outlet side 2b or the high-pressure side of the impeller unit 2 via the impeller 4. The impeller 4 is drive-connected to the shaft 7 of the motor 6 and delivers the cooling fluid from the inlet side 2a to the outlet side 2b. Accordingly, the inlet side 2a is arranged within the impeller 4 and the outlet side 2b accordingly on the circumference of the impeller 4. The guide channel 26 is additionally realised by the cooling fluid jacket 27 in regions. The cooling fluid jacket 27 includes the multiple—here seven—forward channels 28, the return channel 28b and the connecting channel 29 and is formed within the housing wall 11a and the bottom plate 12a by a double-walled region 35.

The respective forward channel 28a is formed in the housing body 11 and in the bottom plate 12a of the bottom 12. The respective forward channel 28a is fluidically connected to the outlet side 2b of the impeller unit 2 via an inlet opening 30 each, wherein the respective inlet opening 30 is formed in the partition wall 11b of the housing body 11. The respective forward channel 28a extends in the housing body 11 or in the housing wall 11 axially or parallel to the axis of rotation RA and its cross-section increases from the longitudinal end 6a to the longitudinal end 6b of the motor 6. The multiple forward channels 28a are formed in the housing body 11 distributed about the axis of rotation RA and fluidically connected to one another within the housing body 11 and in the bottom 12 at bridging points. Within the housing body 11, the forward channels 28a can be flowed through parallel to one another and, with respect to the axis of rotation RA, axially. In the bottom plate 12a of the bottom 12, the multiple connecting channels 28a are formed in an overlap region of the housing body 11 and of the bottom 12 or in an overlap region of the housing wall 11a and the bottom plate 12a. The cover 12b of the bottom 12 is arranged outside the mentioned overlap region and because of this arranged outside the housing body 11 or the housing wall 11a.

The connecting channel 29 is arranged between the bottom plate 12a and the cover 12b and formed meander-like or labyrinth-like. The connecting channel 29 is fluidically connected to the multiple forward channels 28a at an inlet point 31 and to the return channel 28b at an outlet point 32. The connecting channel 29 is formed centrally in the bottom plate 12a and the cover 12b, closes the bottom plate 12a in regions and centrally. In the bottom plate 12a, the multiple connecting channels 28a are arranged circumferentially to the connecting channel 29.

The return channel 28b is formed in the housing body 11 and in the bottom plate 12a of the bottom 12. The return channel 28b is fluidically connected to the inlet side 2a of the impeller unit 2 via an outlet opening 33, wherein the outlet opening 33 is formed in the partition wall 11b of the housing body 11. The return channel 29 extends in the housing body 11 or in the housing wall 11a axially or parallel to the axis of rotation RA and its cross-section increases from the longitudinal end 6a to the longitudinal end 6b of the motor 6. In the bottom plate 12a of the bottom 12, the return channel 28b on the outlet point 32 is fluidically connected to the connecting channel 29.

In the fluid pump 1, the cooling fluid is delivered with the impeller 4 from the fluid inlet 5a on the inlet side 2a to the fluid outlet 5b on the outlet side 2b. From the outlet side 2b, a part of the cooling fluid flows via the fluid outlet 5b out of the fluid pump 1 and a part of the cooling fluid into the cooling fluid jacket 27. In the cooling fluid jacket 27, the cooling fluid is delivered via the inlet openings 30 into the forward channels 28a and further to the connecting channel 29. Then, the cooling fluid enters the connecting channel 29 at the inlet point 31 and flows to the outlet point 32. At the outlet point 32, the cooling fluid flows into the return channel 28b, through the return channel 28b and further via the outlet opening 33 to the inlet side 2a. From the inlet side 2a, the cooling fluid, together with the cooling fluid flowing into the fluid pump 1 via the fluid inlet 5a, is again delivered with the impeller 4 to the outlet side 2b.

FIG. 10 shows an exploded view of the bottom 12 of the motor housing 10 in the fluid pump 1 according to the invention. Here it is noticeable that the cover 12b closes the bottom plate 12a approximately centrally. In addition, separating regions 34 for the fluid-tight separating of the forward channels 28a and the return channels 28b are noticeable in the double-walled region 35.

FIG. 2 shows a view of the housing body 11 of the fluid pump 1 according to the invention from a side facing away from the impeller unit 2. Here, in particular the inlet openings 30 into the forward channels 28a and the outlet opening 33 out of the return channel 28b are noticeable.

This specification can be best understood with reference to the following Numbered Paragraphs:

Numbered Paragraph 1. A fluid pump (1) for a fuel cell system having at least one fuel cell stack of multiple fuel cells, wherein the fluid pump (1) comprises an impeller unit (2)
for delivering a cooling fluid with an impeller (4) that is rotatable about an axis of rotation (RA) and an electric motor (6) for driving the impeller (4) with a motor housing (10), wherein the impeller unit (2) is arranged at a, with respect to the axis of rotation (RA), axial longitudinal end (6a) of the motor (6), wherein the impeller unit (2) comprises an inlet side (2a) with a fluid inlet (5a) and an outlet side (2b) with a fluid outlet (5b) and the impeller (4) separates the inlet side (2a) and the outlet side (2b) from one another, wherein the fluid pump (1) comprises a guide channel (26) for the cooling fluid and the guide channel (26) fluidically connects the inlet side (2a) and the outlet side (2b) via the impeller (4), characterised in that the guide channel (26) is additionally formed in regions by a cooling fluid jacket (27) formed in the motor housing (10).

Numbered Paragraph 2. The fluid pump according to Numbered Paragraph 1, characterised in that the cooling fluid jacket (27) is formed by a double-walled region (35) at least in regions, wherein the double-walled region (35) is formed at least in regions in the motor housing (10) and/or in a pot-shaped housing body (11) of the motor housing (10) and/or in a housing wall (11a) of a pot-shaped housing body (11) of the motor housing (10) that is circumferential to the axis of rotation (RA) and/or in a bottom (12) of the motor housing (10) closing a pot-shaped housing body (11) transversely to the axis of rotation (RA), and/or wherein the double-walled region (35) is formed circumferentially to the axis of rotation (RA) and is completely circumferential to the axis of rotation (RA), and/or wherein the double-walled region (35) is formed by an outer wall and an inner wall spaced apart from the outer wall and delimited towards the outside, and/or wherein the double-walled region (35) comprises at least one separating region (34), wherein by means of the at least one separating region (34) individual channels of the cooling fluid jacket (27) that can be flowed through by the cooling fluid are fluidically separated from one another within the double-walled region (35).

Numbered Paragraph 3. The fluid pump according to either of Numbered Paragraph 1 or 2, characterised in that the cooling fluid jacket (27) comprises at least one forward channel (28a), at least one connecting channel (29) and at least one return channel (28b), and in that the at least one forward channel (28a) leads from the outlet side (2b) of the impeller unit (2) to the at least one connecting channel (29) and the at least one connecting channel (29) from the at least one forward channel (28a) to the at least one return channel (28b) and the at least one return channel (28b) from the at least one connecting channel (29) to the inlet side (2a) of the impeller unit (2).

Numbered Paragraph 4. The fluid pump according to Numbered Paragraph 3, characterised in that the cooling fluid jacket (27) comprises multiple forward channels (28a), wherein the respective forward channels (28a), via an inlet opening (30) each, are fluidically connected to the outlet side (2b) of the impeller unit (2) and are joined to form a common channel at a longitudinal end (6b) of the motor (6) facing away from the impeller unit (2).

Numbered Paragraph 5. The fluid pump according to either one of Numbered Paragraph 3 or 4, characterised in that a cross-section of the at least one forward channel (28a) increases from the inlet side (2a) of the impeller unit (2) to a longitudinal end (6b) of the motor (6) located opposite the impeller unit (2).

Numbered Paragraph 6. The fluid pump according to any one of the Numbered Paragraphs 3 to 5, characterised in that the motor housing (10) comprises a pot-shaped housing body (11) and the housing body (11) is open at a longitudinal end (6b) of the motor (6) located opposite the impeller unit (2), in that the motor housing (10) comprises a bottom (12) oriented transversely to the axis of rotation (RA) and the bottom (12) closes the housing body (11) at a longitudinal end (6b) of the motor (6) located opposite the impeller unit (2), in that the at least one forward channel (28a) and the at least one return channel (28b) is formed in the housing body (11) at least in regions and delimited towards the outside by the housing body (11), and in that the at least one connecting channel (29) is formed in the bottom (12) of the motor housing (10).

Numbered Paragraph 7. The fluid pump according to Numbered Paragraph 6, characterised in that the bottom (12) of the motor housing (10) is formed by a bottom plate (12a) and a cover (12b) and the cover (12b), facing the impeller unit (2), sealingly lies against the bottom plate (12a), and in that the at least one connecting channel (29) is formed between the bottom plate (12a) and the cover (12b) and delimited towards the outside by the bottom plate (12a) and the cover (12b).

Numbered Paragraph 8. The fluid pump according to any one of the Numbered Paragraphs 3 to 7, characterised in that the at least one connecting channel (29) is formed meander-like and/or labyrinth-like, or in that in the at least one connecting channel (29) a turbulence-generating structure is formed, or in that in the at least one connecting channel (29) at least one separate turbulence insert is arranged.

Numbered Paragraph 9. The fluid pump according to any one of the preceding Numbered Paragraphs, characterised in that the fluid pump (1) comprises an inverter (21) for the energy supply of the motor (6), in that the inverter (21) is arranged at a longitudinal end (6b) of the motor (6) located opposite the impeller unit (2) on the motor housing (10) in a heat-transferring manner and adjacent to the cooling fluid jacket (27), and in that the inverter (21) is indirectly coolable via the cooling fluid jacket (27) by the cooling fluid delivered by means of the impeller unit (2).

Numbered Paragraph 10. The fluid pump according to any one of the preceding Numbered Paragraphs, characterised in that the motor (6) comprises a shaft (7) and the shaft (7) is rotatable about the axis of rotation (RA) and drive-connected to the impeller (4) of the impeller unit (2), and in that the fluid pump (1) comprises a bearing (17b) for mounting the shaft (7) at a longitudinal end (6b) of the motor (6) located opposite the impeller unit (2), in that the bearing (17b) is arranged on the motor housing (10) in a heat-transferring manner and adjacent to the cooling fluid jacket (27), in that the bearing (17b) is indirectly coolable via the cooling fluid jacket (27) by the cooling fluid delivered by means of the impeller unit (2).

Numbered Paragraph 11. The fluid pump according to Numbered Paragraphs 7 and 10, characterised in that the bearing (17b) is arranged on the cover (12b) of the bottom (12) and facing the impeller unit (2).

The invention claimed is:

1. A fluid pump for a fuel cell system having at least one fuel cell stack of multiple fuel cells, wherein the fluid pump comprises an impeller unit for delivering a cooling fluid with an impeller that is rotatable about an axis of rotation and an electric motor for driving the impeller with a motor housing, wherein the impeller unit is arranged at an, with respect to the axis of rotation, axial longitudinal end of the motor, wherein the impeller unit comprises an inlet side with a fluid inlet and an outlet side with a fluid outlet and the impeller separates the inlet side and the outlet side from one another, wherein the fluid pump comprises a guide channel for the cooling fluid and the guide channel fluidically connects the inlet side and the outlet side via the impeller, characterised in that a cooling fluid jacket is formed in the motor housing, wherein the cooling fluid jacket comprises multiple forward channels, wherein the respective multiple forward channels, via an inlet opening each, are fluidically connected to the outlet side of the impeller unit and are joined to form a common channel at a longitudinal end of the motor facing away from the impeller unit, and in that the cooling fluid jacket further comprises at least one connecting channel and at least one return channel, and each of the multiple forward channels leads from the outlet side of the impeller unit to the at least one connecting channel and the at least one connecting channel leads from each of the multiple forward channels to the at least one return channel and the at least one return channel leads from the at least one connecting channel to the inlet side of the impeller unit.

2. The fluid pump according to claim 1, characterised in that the cooling fluid jacket is formed by a double-walled region, wherein the double-walled region is formed at least in regions in the motor housing and/or in a pot-shaped housing body of the motor housing and/or in a housing wall of a pot-shaped housing body of the motor housing that is circumferential to the axis of rotation and/or in a bottom of the motor housing closing a pot-shaped housing body transversely to the axis of rotation, and/or wherein the double-walled region is formed circumferentially to the axis of rotation and is completely circumferential to the axis of rotation, and/or wherein the double-walled region is formed by an outer wall and an inner wall spaced apart from the outer wall and delimited towards the outside, and/or wherein the double-walled region comprises at least one separating region, wherein by means of the at least one separating region individual channels of the cooling fluid jacket that can be flowed through by the cooling fluid are fluidically separated from one another within the double-walled region.

3. The fluid pump according to claim 1, characterised in that a cross-section of each of the multiple forward channels increases from the inlet side of the impeller unit to a longitudinal end of the motor located opposite the impeller unit.

4. The fluid pump according to claim 1, characterised in that the motor housing comprises a pot-shaped housing body and the housing body is open at a longitudinal end of the motor located opposite the impeller unit, in that the motor housing comprises a bottom oriented transversely to the axis of rotation and the bottom closes the housing body at a longitudinal end of the motor located opposite the impeller unit, in that each of the multiple forward channels and the at least one return channel are formed in the housing body at least in regions and delimited towards the outside by the housing body, and in that the at least one connecting channel is formed in the bottom of the motor housing.

5. The fluid pump according to claim 4, characterised in that the bottom of the motor housing is formed by a bottom plate and a cover and the cover, facing the impeller unit, sealingly lies against the bottom plate, and in that the at least one connecting channel is formed between the bottom plate and the cover and delimited towards the outside by the bottom plate and the cover.

6. The fluid pump according to claim 1, characterised in that the at least one connecting channel is formed meander-like and/or labyrinth-like, or in that in the at least one connecting channel a turbulence-generating structure is formed, or in that in the at least one connecting channel at least one separate turbulence insert is arranged.

7. The fluid pump according to claim 1, characterised in that the fluid pump comprises an inverter for the energy supply of the motor, in that the inverter is arranged at a longitudinal end of the motor located opposite the impeller unit on the motor housing in a heat-transferring manner and adjacent to the cooling fluid jacket, and in that the inverter is indirectly coolable via the cooling fluid jacket by the cooling fluid delivered by means of the impeller unit.

8. The fluid pump according to claim 1, characterised in that the motor comprises a shaft and the shaft is rotatable about the axis of rotation and drive-connected to the impeller of the impeller unit, and in that the fluid pump comprises a bearing for mounting the shaft at a longitudinal end of the motor located opposite the impeller unit, in that the bearing is arranged on the motor housing in a heat-transferring manner and adjacent to the cooling fluid jacket, in that the bearing is indirectly coolable via the cooling fluid jacket by the cooling fluid delivered by means of the impeller unit.

9. The fluid pump according to claim 5,
characterised
in that the bearing is arranged on the cover of the bottom and facing the impeller unit.

\* \* \* \* \*